(12) United States Patent
Choi

(10) Patent No.: US 8,457,632 B2
(45) Date of Patent: Jun. 4, 2013

(54) SYSTEM AND METHOD FOR MANAGING FEMTO BASE STATIONS AND A FEMTO ZONE IN A WIRELESS COMMUNICATION NETWORK

(75) Inventor: Hyuk-Jung Choi, Seongnam-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 39 days.

(21) Appl. No.: 13/266,237

(22) PCT Filed: Apr. 26, 2010

(86) PCT No.: PCT/KR2010/002597
§ 371 (c)(1),
(2), (4) Date: Oct. 25, 2011

(87) PCT Pub. No.: WO2010/126261
PCT Pub. Date: Nov. 4, 2010

(65) Prior Publication Data
US 2012/0058765 A1    Mar. 8, 2012

(30) Foreign Application Priority Data
Apr. 27, 2009    (KR) .......................... 10-2009-0036462

(51) Int. Cl.
*H04W 4/00* (2009.01)
(52) U.S. Cl.
USPC .............. 455/435.1; 455/422.1; 370/328; 370/338
(58) Field of Classification Search
USPC ..... 455/435.1–446, 414.1, 414.2, 421–426.2; 370/328–338
See application file for complete search history.

(56) References Cited

U.S. PATENT DOCUMENTS

| 2007/0105527 A1* | 5/2007 | Nylander et al. ............. 455/403 |
| 2008/0261602 A1 | 10/2008 | Livneh |
| 2009/0067333 A1 | 3/2009 | Ergen et al. |
| 2009/0098890 A1 | 4/2009 | Vasudevan |
| 2011/0003608 A1* | 1/2011 | Forenza et al. ............... 455/501 |
| 2012/0093078 A1* | 4/2012 | Perlman et al. ............... 370/328 |

FOREIGN PATENT DOCUMENTS

| KR | 1020090023830 A | 3/2009 |
| KR | 1020090037199 A | 4/2009 |

OTHER PUBLICATIONS

International Search Report for PCT/KR2010/002597 filed on Apr. 26, 2010.
Written Opinion for PCT/KR2010/002597 filed on Apr. 26, 2010.

* cited by examiner

*Primary Examiner* — Chuong A Ngo

(57) ABSTRACT

The system and method of the present invention comprise: receiving a registration request from a first femto base station from among the femto base stations in the femto zone that share a backhaul link; storing the registration of the femto base station and determining the first femto base station as a master base station or a candidate base station in accordance with the registration request; and transmitting, to the first femto base station, a registration acknowledgement message which contains the maximum backhaul link capacity of the femto zone and master base station information if the first femto base station is determined to be master base station, or a registration acknowledgement message which contains master base station information and candidate base station information if the first femto base station is determined to be the candidate base station.

18 Claims, 7 Drawing Sheets

SYSTEM AND METHOD FOR MANAGING FEMTO BASE STATIONS AND A FEMTO ZONE IN A WIRELESS COMMUNICATION NETWORK

TECHNICAL FIELD

The present invention relates to a wireless communication network, and more particularly, to a system and method for managing at least one femto base station (hereinafter, referred to as 'BS') in a femto zone including a plurality of femto cells and the femto zone in a wireless communication network.

BACKGROUND ART

As various high speed data service systems such as High Speed Downlink Packet Access (HSDPA), mobile Worldwide Interoperability for Microwave Access (WiMAX) have appeared, a wireless communication service has developed as a type of wireless data service. However, since the high speed data service system has channel capacity with only a few Mbps and the channel capacity should be shared by several hundred users in a BS coverage area, download speed per a user is only from several tens to several hundreds of Kbps. Therefore, users that have experienced wired and wireless Local Area Network (LAN) with several tens of Mbps can not satisfy current data speed.

As a measure for settling this problem, there is an attempt that provides transmission capacity of a few Mbps for each user in mobile communication system by using a BS that is manufactured at low cost, installed indoors (e.g., home, office), and used by a few users. In relation to this, a femto cell that is managed by a small BS has proposed recently. Herein, the femto cell is a compound word of femto meaning $10^{-15}$ and cell meaning a service area unit that is managed by one BS in mobile communication system. The femto cell denotes a smaller service area than an existing service area in mobile communication system. The femto cell makes it possible that a mobile station (hereinafter, referred to as 'MS') freely performs wired/wireless communication by connecting a femto BS to indoor wired network (e.g., Digital Subscriber Line (DSL) modem).

At side of communication provider, since the femto BS directly transmits mobile communication data to a core network without indoor repeater, the femto BS provides advantages that can reduce network construction cost, reduce frequency load, improve call quality, provide combination product, and provide platform expanding mobile communication business area to home entertainment application. At side of user, since the femto BS is installed indoors, the femto BS provides advantages that provide voice and data communication service indoors at low cost.

Meanwhile, one communication provider may install several million femto BSs in various areas to provide femto cell service. In this case, the communication provider demands measures that can efficiently manage several million femto BSs. According to this demand, a measure that separately constructs a management system for femto BSs has proposed. However, the number of femto BSs that can be simultaneously managed by a separately constructed system is limited. Therefore, an efficient management for femto BSs is very important to the communication provider.

Since the femto BS is equipment that is mainly located indoors and is directly managed by the user, there are problems that the femto BS may be weak on security and provide a service exceeding the contracted service by means of an arbitrary handling of the user. For example, the user who has contracted for service of maximal 1 Mbps may use service of 3 Mbps by means of the arbitrary handling of the user. Also, since the power of the femto BS may easily be on/off by the user, it is difficult for the communication provider to always manage the states of all femto BSs.

Meanwhile, in case of the BS providing public service, since the communication provider provides service to the user via a broadband backhaul link with large capacity, the capacity of the backhaul link rarely limit a wireless link service. However, since the femto BS provides service to the users that are located in various areas and communication environments, the femto BS may provide service in an area in which a wired link with the limited backhaul link capacity exists or may use an internet line with small capacity as a backhaul link. In this case, since the capacity of the backhaul link may be smaller than the capacity of wireless links by the femto BSs, thereby it is difficult for the femto BS to provide service.

DISCLOSURE

Technical Problem

Therefore, the present invention has been made in view of the above-mentioned problems, and it is an object of the present invention to provide an efficient service by using femto BSs in a wireless communication network.

It is another object of the present invention to provide a system and method for efficiently managing femto BSs in each femto zone in a wireless communication network.

It is further another object of the present invention to provide a femto BS for managing a femto zone and a method for managing a femto BS in a wireless communication network.
Technical Solution According to one aspect of the present invention, there is provided a method for managing a femto zone in a wireless communication network, the method comprising: receiving a registration request message from a first femto base station among the femto base stations in the femto zone that share a backhaul link; registering the first femto base station and determining the first femto base station as a master base station or a candidate base station in accordance with the registration request message; and transmitting a registration acknowledgement message to the first femto base station in response to the registration request message, wherein the registration acknowledgement message includes the maximum allowable backhaul link capacity of the femto zone and master base station information if the first femto base station is determined as the master base station, and includes the master base station information and candidate base station information if the first femto base station is determined as the candidate base station.

According to another aspect of the present invention, there is provided a method for managing a femto zone in a wireless communication network, the method comprising: determining a backhaul link capacity of a first femto base station in consideration of the maximum allowable backhaul link capacity of the femto zone and subscription information of the first femto base station, by the first femto base station that is designated as a master base station; and if the first femto base station receives a registration request message from a second femto base station that is designated as a candidate base station, determining the backhaul link capacity of the second femto base station in consideration of the maximum allowable backhaul link capacity of the femto zone and subscription information of the second femto base station, and transmitting the backhaul link capacity of the second femto base station to the second femto base station, by the first femto base station, wherein the master base station and the candidate base station are determined by a femto zone management system that manages femto base stations in each femto zone, and the femto base stations in each femto zone share a backhaul link.

Meanwhile, according to one aspect of the present invention, there is provided a femto base station in a wireless communication network, the femto base station comprising: a network interfacing part for communicating with a femto zone management system and at least one femto base station in a femto zone that share a backhaul link; a transmission/reception part for communicating with a mobile station; a wireless processor for controlling the transmission/reception part; a network processor for controlling the network interfacing part; a setting part for setting as a master base station or a candidate base station in accordance with a message that the network interfacing part receives; a storing part for storing list information and subscription information for the femto base stations in the femto zone and base station information indicating that each femto base station is set as the master base station or the candidate base station, if being set as the master base station; and a determining part for determining backhaul link capacities of the femto base stations registered in the femto zone.

Also, according to one aspect of the present invention, there is provided a femto zone management system in a wireless communication network, the femto zone management system comprising: a network interfacing part for communicating with femto base stations in at least one femto zone that share a backhaul link; a determining part for determining each femto base station requesting a registration as a master base station or a candidate base station; and a storing part for storing list information and subscription information for the femto base stations in the femto zone and storing base station information indicating that each femto base station is set as the master base station or the candidate base station, wherein the network interfacing part transmits a registration acknowledgement message to the femto base station requesting the registration, and wherein the registration acknowledgement message includes the maximum allowable backhaul link capacity of the femto zone, base station information, list information and subscription information of the femto base stations if the femto base station requesting the registration is determined as the master base station, and includes the base station information if the femto base station requesting the registration is determined as the candidate base station.

Advantageous Effects

The present invention can provide an efficient service in a femto cell by using a femto BS in a wireless communication network. Also, the present invention can provide a femto BS for efficiently managing a femto zone and provide a system and method for managing a femto BS in a wireless communication network.

The present invention can reduce a burden that a communication provider should manage all femto BSs in real time, reduce a burden of a centralized femto BS management system, and manage femto BSs in decentralized type by setting a femto zone for each local area.

The present invention can efficiently use a plurality of femto BSs in case of a wired link that has less capacity than a wireless link, and efficiently provide service to subscribers by considering a capacity of a wired link for service area and dynamically determining maximal data capacity for each subscriber.

Also, the present invention can promptly cope with change of a femto BS state (e.g., power on/off of the femto BS, failure of the femto BS, user's arbitrary operation for the femto BS).

DESCRIPTION OF THE DRAWINGS

The above and other aspects, features and advantages of the present invention will become more apparent from the following detailed description when taken in conjunction with the accompanying drawings in which.

MODE FOR INVENTION

Figure 1:
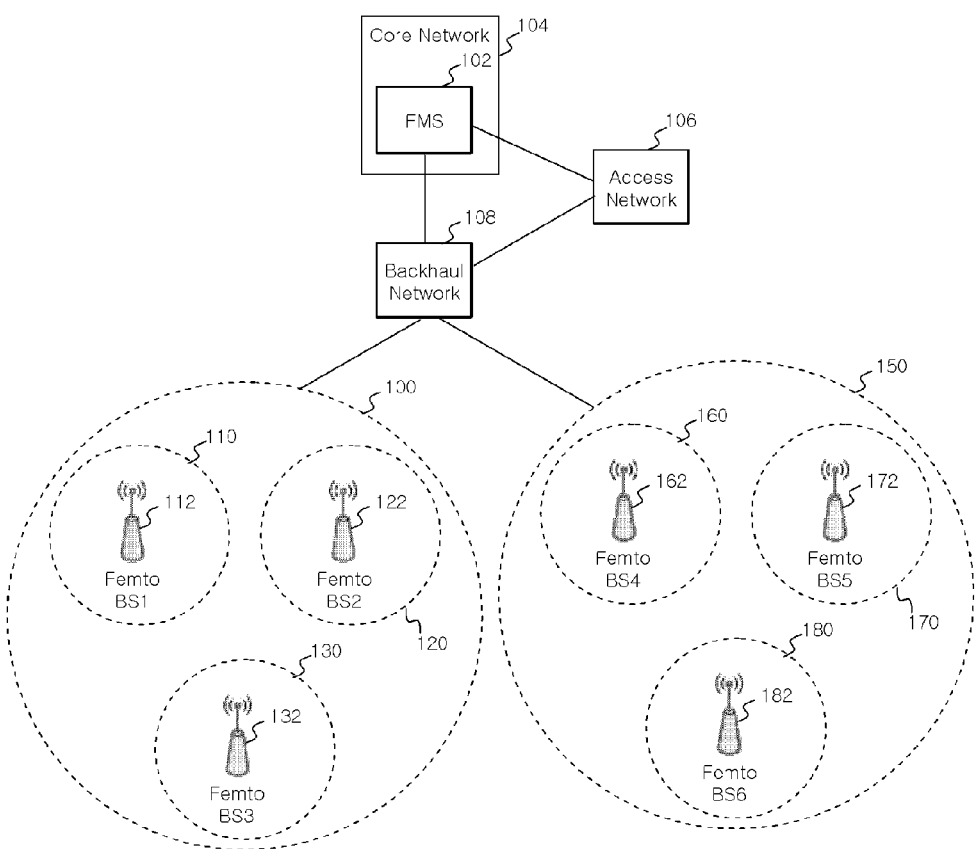
FIG. 1 is a diagram illustrating a structure of a wireless communication network according to an embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention proposes a femto zone management system and method for efficiently managing femto BSs of each femto zone in a wireless communication system, a femto BS for managing a femto zone, and a femto BS management method. Herein, the femto zone management system and method, the femto BS, and the femto BS management method according to the present invention are applicable to various wireless communication networks such as a portable internet network as a Broadband Wireless Access (BWA) network (e.g., Wireless Broadband (Wibro), Worldwide Interoperability for Microwave Access (WiMAX)), a Wideband Code Division Multiple Access (WCDMA) network, etc.

According to the present invention, it is possible to efficiently manage the femto BS as a small BS for providing communication services to users in a wireless communication network, the femto cell as a service area for being managed by the femto BS, and the femto zone including the femto cells. Also, according to the present invention, it is possible to efficiently manage the femto zone including at least one femto cell, the femto BS, and the femto cell so as to extend coverage indoors (e.g., home, office), guarantee Quality of Service (QoS), and provide various wired/wireless services to users. For reference, the femto BS denotes a micromini mobile communication BS that performs user access function and communication service function among general functions of the BS such as user access function, user management function, communication service function, resource allocation function, and control and management function for them.

Also, according to the present invention, it is possible to efficiently determine a Femto zone Management System (hereinafter, referred to as 'FMS') for managing and controlling the femto zones and femto BSs, efficiently determine a master femto BS and candidate femto BS among femto BSs interconnected via wired/wireless links (e.g., backhaul links), and efficiently manage the femto BSs so that the master femto BS and candidate femto BS provide communication services to users in the femto cell.

Hereinafter, with reference to FIG. 1, a structure of a wireless communication network according to an embodiment of the present invention will now be described.

FIG. 1 is a diagram illustrating a structure of a wireless communication network according to an embodiment of the present invention.

Referring to FIG. 1, the wireless communication network includes a FMS 102 that manages femto zones 100, 150 and is included in a core network 104 of a communication provider, femto BSs 112, 122, 132, 162, 172, 182 that respectively manage femto cells 110, 120, 130, 160, 170, 180 in femto zones 100, 150, and an access network 106 that provides communication services to the femto zones 100, 150 via a backhaul network 108.

The core network 104, the access network 106, and the backhaul network 108 are interconnected via wired/wireless links (e.g., backhaul links). The FMS 102 may be included in the core network 104 of the communication provider or in the access network 106 that provides communication services via the backhaul network 108. The femto zones 100, 150 communicate with the core network 104 (particularly, the FMS 102) of the communication provider and the access network 106 via the backhaul network 108, and receive the communication services from the access network 106 via the backhaul network 108. The backhaul network 108 may be a public Internet Protocol (IP) network, and the access network 106 includes an Access Control Router (ACR), etc. Also, the femto BSs 112, 122, 132, 162, 172, 182 may be Access Points (APs) that respectively manage coverage of small cells such as the femto cells.

Femto zone IDs identifying each femto zone 100, 150 are respectively allocated to the femto zones 100, 150, and maximum allowable backhaul link capacities for each femto zone 100, 150 are respectively allocated to the femto zones 100, 150. Herein, the maximum allowable backhaul link capacity for the femto zone denotes the maximum backhaul link capacity that can be used by all femto BSs in the corresponding femto zone. The sum of the backhaul link capacities that are used by all femto BSs in the corresponding femto zone can not exceed the maximum allowable backhaul link capacity of the corresponding femto zone.

Meanwhile, when each femto BS 112, 122, 132, 162, 172, 182 provides communication services to users in each femto cell 110, 120, 130, 160, 170, 180, each femto BS 112, 122, 132, 162, 172, 182 in the femto zones 100, 150 together uses the maximum allowable backhaul link capacity of each femto zone 100, 150 since they share the backhaul link provided by the backhaul network 108. That is, the femto BSs 112, 122, 132 in the first femto zone 100 together use the maximum allowable backhaul link capacity of the first femto zone 100, and the femto BSs 162, 172, 182 in the second femto zone 150 together use the maximum allowable backhaul link capacity of the second femto zone 150. Consequently, the femto BSs 112, 122, 132, 162, 172, 182 provide communication services within the maximum allowable backhaul link capacity of the femto zones 100, 150.

The FMS 102 is connected with the backhaul network 108 and the femto BSs 112, 122, 132, 162, 172, 182 via backhaul links, and manages and controls the femto BSs 112, 122, 132, 162, 172, 182 in the femto zones 100, 150. The FMS 102 manages the maximum allowable backhaul link capacity of the femto zones 100, 150, and manages and stores list information and subscription information for the femto BSs 112, 122, 132, 162, 172, 182 in the femto zones 100, 150.

The list information includes Identifier (ID) and/or Internet Protocol (IP) address of each femto BS 112, 122, 132, 162, 172, 182, and the subscription information includes service contract information (e.g., payment system, service type, maximum data rate) for subscribers that receive communication services from the femto BSs 112, 122, 132, 162, 172, 182.

Although not shown in FIG. 1, the FMS 102 managing the femto zones 100, 150 includes a storing part that stores list information and subscription information for the femto BSs 112, 122, 132, 162, 172, 182 in the femto zones 100, 150, and master BS information and candidate BS information of each femto zone 100, 150, a determining part that determines the master BS and the candidate BS for the femto BSs belonging to each femto zone 100, 150, and an interfacing part that communicates with the femto BSs 112, 122, 132, 162, 172, 182. Also, the FMS 102 includes a checking part that performs a Keep Alive process with the registered femto BSs (particularly, the master BS) in the femto zones 100, 150, and allocates and manages the maximum allowable backhaul link capacity of each femto zone 100, 150.

Each femto BS 112, 122, 132, 162, 172, 182 in each femto zone 100, 150 includes a network interfacing part that communicates with other femto BSs in the corresponding femto zone, a setting part that sets the corresponding femto BS as the master femto BS or the candidate femto BS, a determining part that determines backhaul link capacity of the master femto BS and/or the candidate femto BS within the maximum allowable backhaul link capacity of each femto zone, a storing part that stores list information and subscription information for the femto BSs in each femto zone and master BS information and candidate BS information of each femto zone, and a checking part that performs a Keep Alive process with the FMS 102 or other femto BSs registered in the corresponding femto zone. Also, Each femto BS 112, 122, 132, 162, 172, 182 includes a transmission/reception part that communicates with MSs within the allocated backhaul link capacity, a network processor that controls the network interfacing part, and a wireless processor that controls the transmission/reception part.

Hereinafter, based on the first femto zone 100 of the femto zones 100, 150, the femto zone and femto BS management schemes according each situation will now be described. Then, with reference to FIG. 2, a case that a femto BS among femto BSs in a femto zone is firstly registered in a wireless communication network according to an embodiment of the present invention will now be described.

Figure 2:
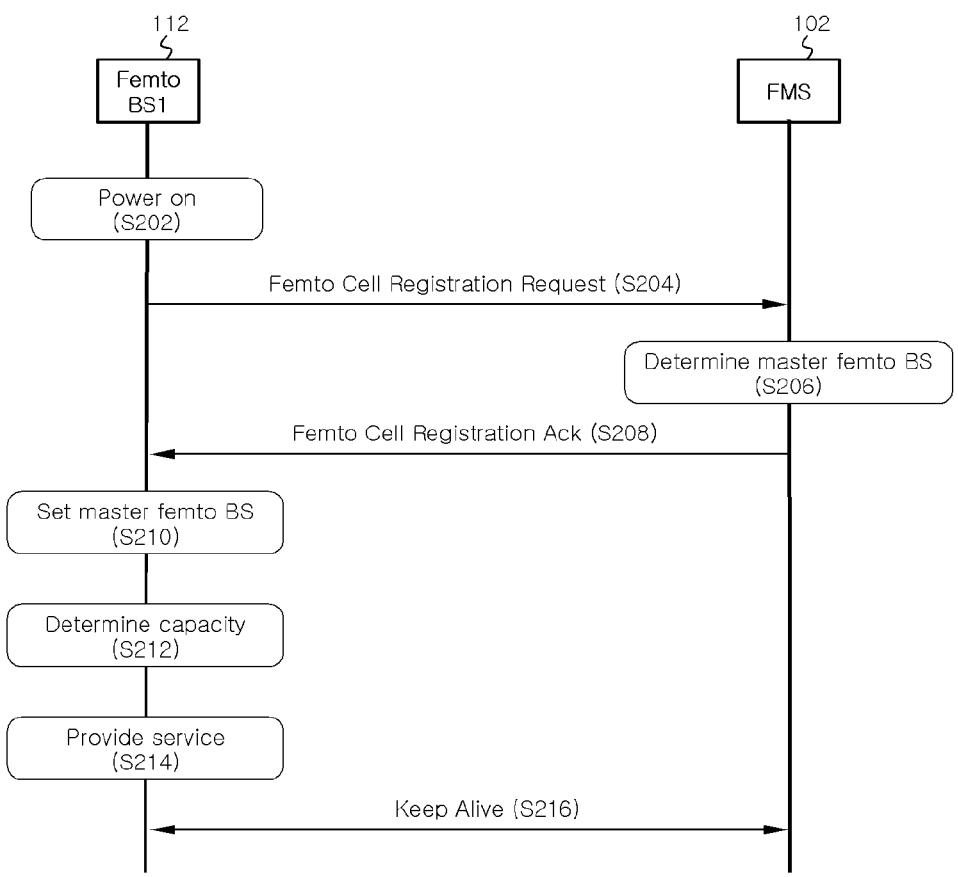
FIG. 2 is a diagram illustrating a process that registers the first femto BS with a femto zone in a wireless communication network according to an embodiment of the present invention.

FIG. 2 is a diagram illustrating a process that registers a femto BS with a femto zone in a wireless communication network according to an embodiment of the present invention. For reference, FIG. 2 illustrates a case that the first femto BS 112 among the femto BSs 112, 122, 132 in the first femto zone 100 is registered.

Referring to FIG. 2, when the user of the first femto BS 112 among the femto BSs 112, 122, 132 in the first femto zone 100 powers on and drives the first femto BS 112 (Step S202), the first femto BS 112 transmits a Femto Cell Registration Request message to the FMS 102 by using the predetermined information for service start (Step S204). Herein, the predetermined information denotes the information that has been determined and stored in the first femto BS 112 at establishing the first femto BS 112 in the first femto cell 110, and includes the IP address of the FMS 102. The first femto BS 112 is the femto BS that has been firstly driven in the first femto zone 100, and denotes the femto BS that will firstly provide service to the user in the first femto cell 100. The Femto Cell Registration Request message denotes the message that requests information for service start to the FMS 102 in order to provide service to the user in the first femto cell 110.

Then, the FMS 102 receives the Femto Cell Registration Request message from the first femto BS 112, stores registration information of the first femto BS 112, and checks whether a preregistered femto BS exists in the first femto zone 100. If the preregistered femto BS does not exist, the FMS 102 determines the first femto BS 112 as a master femto BS of the first femto zone 100 (Step S206). Herein, the FMS 102, as mentioned above, manages and stores the maximum allowable backhaul link capacity of the first femto zone 100, and manages and stores the list information and the subscription information for the femto BSs 112, 122, 132 in the first femto zone 100. Also, in accordance with the determination of the master femto BS, the FMS 102 manages and stores master BS information that the first femto BS 112 has been determined as the master femto BS in the first femto zone 100. For reference, the master BS information includes the ID and/or IP address of the first femto BS 112.

Thereafter, the FMS 102 transmits a Femto Cell Registration Acknowledgement message including the master BS information to the first femto BS 112 (Step S208). Herein, the Femto Cell Registration Acknowledgement message includes not only the master BS information that the first femto BS 112 has been determined as the master femto BS in the first femto zone 100, but also the maximum allowable backhaul link capacity of the first femto zone 100 and the list information and the subscription information of the femto BSs 112, 122, 132.

Then, the first femto BS 112 receives the Femto Cell Registration Acknowledgement message from the FMS 102, checks information included in the Femto Cell Registration Acknowledgement message, and determines itself as the master femto BS of the first femto zone 100 according to the master BS information included in the Femto Cell Registration Acknowledgement message (Step S210). Consequently, the first femto BS 112 acts as the master femto BS in the first femto zone 100.

Thereafter, the first femto BS 112 determines the backhaul link capacity of the first femto BS 112 registered in the first femto zone 100 within the maximum allowable backhaul link capacity of the first femto zone 100, in consideration of the maximum allowable backhaul link capacity and the subscription information of the first femto BS 112 included in the Femto Cell Registration Acknowledgement message (Step S212). Herein, the subscription information is the service contract information for the user that uses the femto BS, and includes information about the payment system (e.g., premium payment system, normal payment system), the service type, the maximum data rate, etc. The backhaul link capacity of the first femto BS 112 may be determined within range that does not exceed the maximum allowable backhaul link capacity of the first femto zone 100 and does not exceed the maximum allowable backhaul link capacity of the first femto BS 112 that has been determined by the subscription information of the first femto BS 112. Herein, the backhaul link capacity of the femto BS denotes the backhaul link capacity that the corresponding femto BS may use for providing communication service within the maximum allowable backhaul link capacity of the first femto zone, and is determined by the master femto BS of the femto zone. The maximum allowable backhaul link capacity of the femto BS denotes the maximum backhaul link capacity that the corresponding femto BS can use for providing communication service, and is determined by the subscription information of the femto BS.

The first femto BS 112 provides service to the user in the first femto cell within the determined backhaul link capacity (Step S214), and the FMS 102 and the first femto BS 112 perform the Keep Alive process that periodically checks connection (Step S216).

Hereinafter, with reference to FIG. 3, a case that the other femto BS is registered after registration of one femto BS, among femto BSs in a femto zone in a wireless communication network according to an embodiment of the present invention, will now be described.

Figure 3:
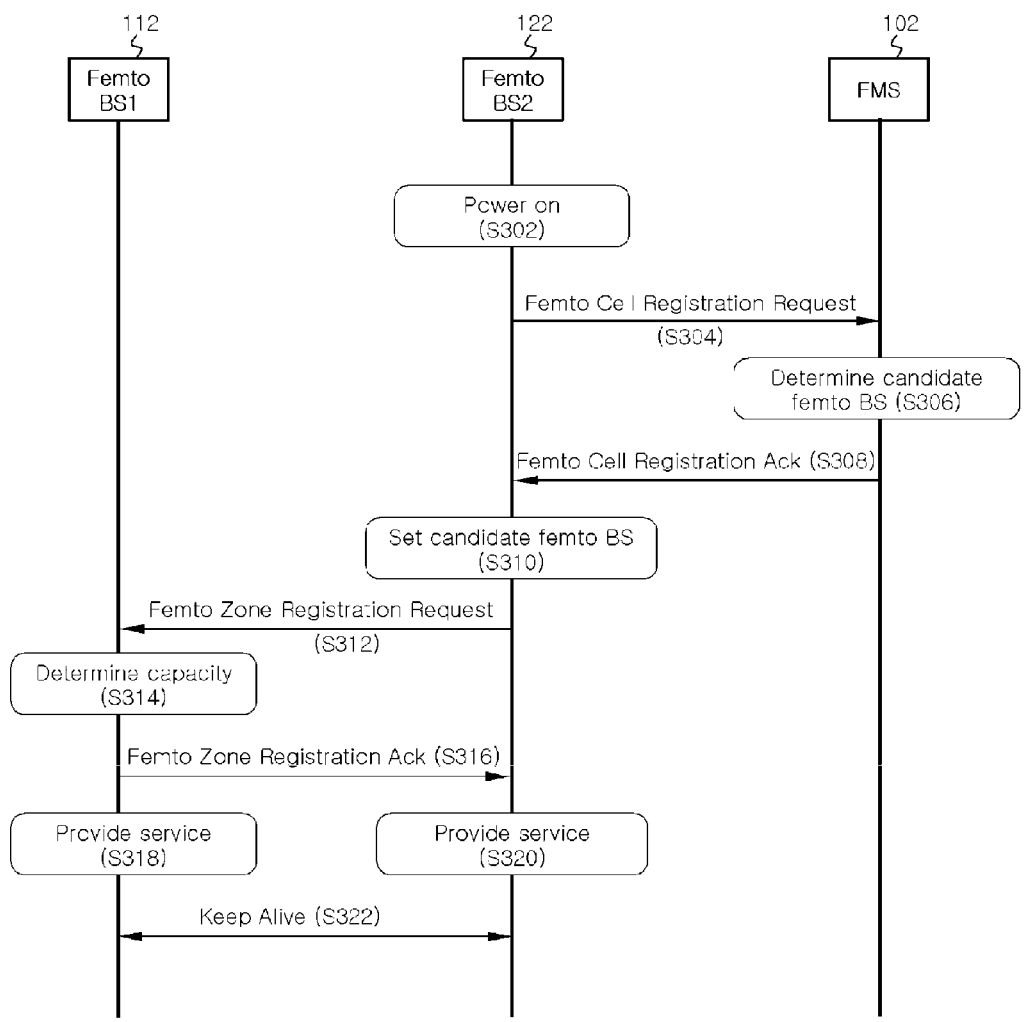
FIG. 3 is a diagram illustrating a process that registers the second femto BS with a femto zone in a wireless communication network according to an embodiment of the present invention.

FIG. 3 is a diagram illustrating a process that registers the other femto BS after the process of FIG. 2, in a wireless communication network according to an embodiment of the present invention. For reference, FIG. 3 illustrates a case that the second femto BS 122 is registered in the first femto zone 100 after registration of the first femto BS 112.

Referring to FIG. 3, after the first femto BS 112 has been registered in the first femto zone 100, when the user of the second femto BS 122 powers on and drives the second femto BS 122 (Step S302), the second femto BS 122 transmits the Femto Cell Registration Request message to the FMS 102 by using the predetermined information for service start (Step S304). Herein, the predetermined information denotes the information that has been determined and stored in the second femto BS 122 at establishing the second femto BS 122 in the second femto cell 120, and includes the IP address of the FMS 102. Also, the Femto Cell Registration Request message denotes the message that requests information for service start to the FMS 102 in order to provide service to the user in the second femto cell 120.

Then, the FMS 102 receives the Femto Cell Registration Request message from the second femto BS 122, stores registration information of the second femto BS 122, and checks whether a preregistered femto BS exists in the first femto zone 100. If the preregistered femto BS exists (i.e., if the master femto BS exists), the FMS 102 determines the second femto BS 122 as a candidate femto BS of the first femto zone 100 (Step S306). Herein, the FMS 102, as mentioned above, manages and stores the maximum allowable backhaul link capacity of the first femto zone 100, and manages and stores the list information and the subscription information for the femto BSs 112, 122, 132 in the first femto zone 100. Also, in accordance with the determination of the candidate femto BS, the FMS 102 manages and stores candidate BS information that the second femto BS 122 has been determined as the candidate femto BS in the first femto zone 100. For reference, the candidate BS information includes the ID and/or IP address of the second femto BS 122. In this case, as mentioned above, the FMS 102 manages and stores the master BS information.

Thereafter, the FMS 102 transmits the Femto Cell Registration Acknowledgement message including the master BS information and the candidate BS information to the second femto BS 122 (Step S308). Herein, the Femto Cell Registration Acknowledgement message includes the master BS information that the first femto BS 112 has been determined as the master femto BS in the first femto zone 100 and the candidate BS information that the second femto BS 122 has been determined as the candidate femto BS in the first femto zone 100.

Then, the second femto BS 122 receives the Femto Cell Registration Acknowledgement message from the FMS 102, checks information included in the Femto Cell Registration Acknowledgement message, and determines itself as the candidate femto BS of the first femto zone 100 according to the candidate BS information included in the Femto Cell Registration Acknowledgement message (Step S310). Consequently, the second femto BS 122 acts as the candidate femto BS in the first femto zone 100.

Thereafter, the second femto BS 122 checks that the first femto BS 112 is the master femto BS in the first femto zone 100, through the master BS information included in the Femto Cell Registration Acknowledgement message, and transmits a Femto Zone Registration Request message including the candidate BS information to the first femto BS 112 (Step S312). Herein, the second femto BS 122 checks the ID and/or IP address of the first femto BS 112 from the master BS information included in the Femto Cell Registration Acknowledgement message, and transmits the Femto Zone Registration Request message to the first femto BS 112. For reference, preferably, the Femto Zone Registration Request message includes the candidate BS information except the subscription information of the second femto BS 122. However, if the Femto Cell Registration Acknowledgement message that the first femto BS 112 receives from the FMS 102 includes the maximum allowable backhaul link capacity of the first femto zone 100 and the subscription information of the first femto BS 112, the Femto Zone Registration Request message that the first femto BS 112 receives from the second femto BS 122 further includes the subscription information of the second femto BS 122 as well as the candidate BS information.

Then, the first femto BS 112 receives the Femto Zone Registration Request message from the second femto BS 122, and checks the candidate BS information included in the Femto Zone Registration Request message. The first femto BS, as mentioned in FIG. 2, determines the backhaul link capacities of the femto BSs (e.g., the backhaul link capacities of the first femto BS 112 and the backhaul link capacity of the second femto BS 122) registered in the first femto zone 100 within the maximum allowable backhaul link capacity of the first femto zone 100, in consideration of the maximum allowable backhaul link capacity of the first femto zone 100 and the list information and the subscription information of the femto BSs included in the Femto Cell Registration Acknowledgement message (Step S314). Herein, the subscription information is the service contract information for the user that uses the femto BS, and includes information about the payment system (e.g., premium payment system, normal payment system), the service type, the maximum data rate, etc.

The backhaul link capacities of the first femto BS 112 and the second femto BS 122 may be determined within range that does not exceed the maximum allowable backhaul link capacity of the first femto zone 100 and does not exceed the maximum allowable backhaul link capacities of the first femto BS 112 and the second femto BS 122 that have been determined by the subscription information of the first femto BS 112 and the second femto BS 122. Herein, the first femto BS 112 statically determines the backhaul link capacities of the first femto Bs 112 and the second femto BS 122 as the same size or dynamically determines the backhaul link capacities of the first femto Bs 112 and the second femto BS 122 according to the capacity priority orders of the first femto BS 112 and the second femto BS 122, within range that does not exceed the maximum allowable backhaul link capacity of the first femto zone 100 and does not exceed each maximum allowable backhaul link capacity of each femto BS.

The capacity priority orders are determined by combining capacity allocation orders and capacity allocation size orders of the femto BSs when the master femto BS determines the backhaul link capacities of the femto BSs registered in the femto zone. Herein, the capacity allocation orders and the capacity allocation size orders of the femto BSs are determined according to registration orders of the femto BSs registered in the femto zone or according to service contract orders of the users through the subscription information of the femto BSs.

For example, the capacity allocation order of the first registered femto BS (i.e., the master femto BS) may be determined as the highest level, and the capacity allocation orders of the remained candidate femto BSs may be determined as the same level or as different levels according to the registration orders. Herein, the registration orders of the candidate femto BSs may be determined by the candidate BS information included in the Femto Zone Registration Request messages that the candidate femto BSs transmit the master femto BS. Also, according to the service contract orders of the users, the capacity allocation order of the femto BS corresponding to the premium payment system may be determined as higher level and the capacity allocation order of the femto BS corresponding to the normal payment system may be determined as lower level. And, according to the sizes of the maximum allowable backhaul link capacities of the femto BSs, the capacity allocation order corresponding to the larger size may be determined as higher level or lower level. Also, according to the service types that the femto BSs provide to the users, the capacity allocation order of the femto BS that should firstly provide service data (e.g., real-time service data) may be determined as higher level.

Also, the capacity allocation size orders may be determined so that the backhaul link capacities of the femto BSs are allocated as the same size or as the sizes corresponding to the maximum allowable backhaul link capacities of the femto BSs. Also, the capacity allocation size orders may be determined so that the backhaul link capacity of the first registered femto BS (i.e., the master femto BS) is allocated as the largest size, and the backhaul link capacities of the remained candidate femto BSs are allocated as the same size or as different sizes according to the registration orders.

Herein, the master femto BS may determines the capacity allocation orders and the capacity allocation size orders of the femto BSs through not only the above examples but also other conditions. Then, the master femto Bs determines the capacity priority orders by combining the capacity allocation orders and the capacity allocation size orders, and determines the backhaul link capacities of the femto BSs according to the capacity priority orders.

Thereafter, the first femto BS 112 transmits a Femto Zone Registration Acknowledgement message including the backhaul link capacity of the second femto BS 122 to the second femto BS 122 (Step S316). Then, the first femto BS 112 provides service to the user in the first femto cell 110 within the determined backhaul link capacity of the first femto BS 112 (Step S318).

Also, the second femto BS 122 receives the Femto Zone Registration Acknowledgement message from the first femto BS 112, and checks the backhaul link capacity of the second femto BS 122 included in the Femto Zone Registration Acknowledgement message. Then, the second femto BS 122 provides service to the user in the second femto cell 120 within the backhaul link capacity of the second femto BS 122

(Step S320), and the first femto BS 112 and the second femto BS 122 perform the Keep Alive process that periodically checks connection (Step S322).

Hereinafter, with reference to FIG. 4, a case that a new femto BS is registered after registrations of two femto BSs, among femto BSs in a femto zone in a wireless communication network according to an embodiment of the present invention, will now be described.

Figure 4:
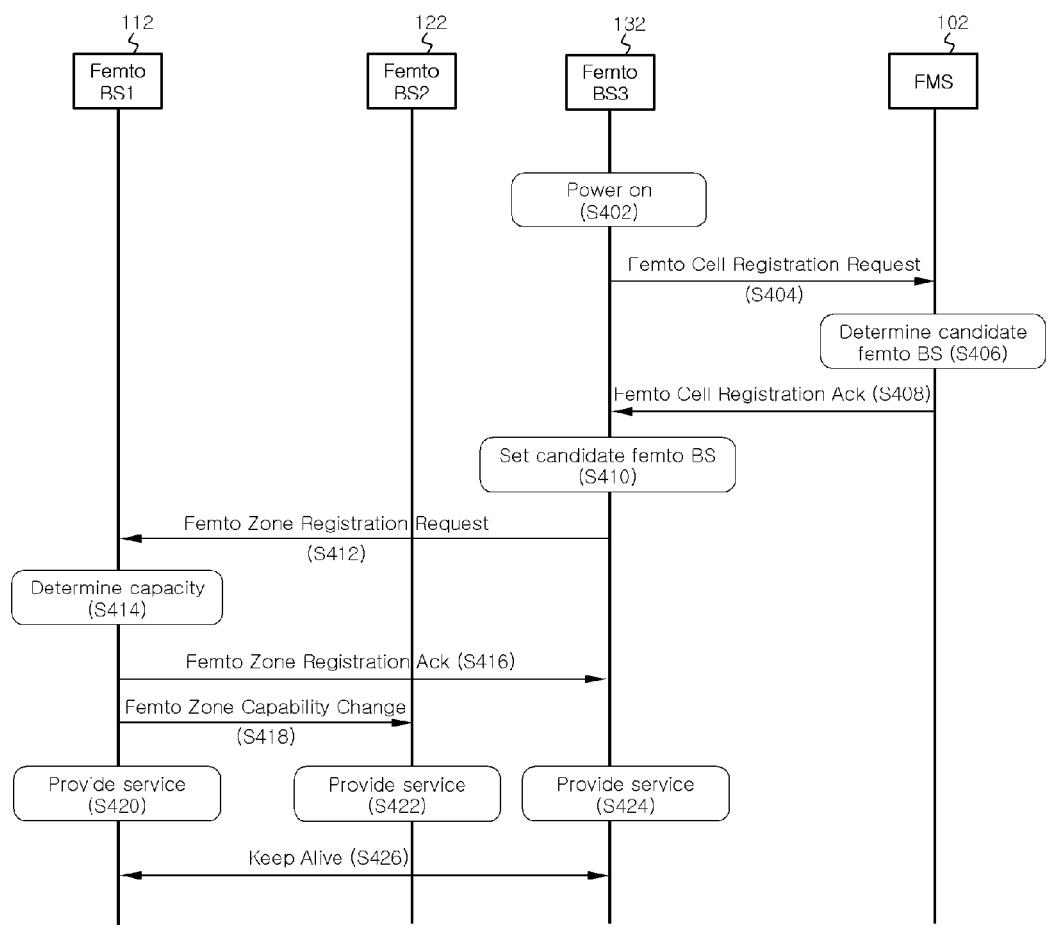
FIG. 4 is a diagram illustrating a process that registers the third femto BS with a femto zone in a wireless communication network according to an embodiment of the present invention.

FIG. 4 is a diagram illustrating a process that registers a new femto BS after the process of FIG. 3, in a wireless communication network according to an embodiment of the present invention. For reference, FIG. 4 illustrates a case that the third femto BS 132 is registered in the first femto zone 100 after registrations of the first femto BS 112 and the second femto BS 122.

Referring to FIG. 4, after the first femto BS 112 and the second femto BS 122 have been registered in the first femto zone 100, when the user of the third femto BS 132 powers on and drives the third femto BS 132 (Step S402), the third femto BS 132 transmits the Femto Cell Registration Request message to the FMS 102 by using the predetermined information for service start (Step S404). Herein, the predetermined information denotes the information that has been determined and stored in the third femto BS 132 at establishing the third femto BS 132 in the third femto cell 130, and includes the IP address of the FMS 102. Also, the Femto Cell Registration Request message denotes the message that requests information for service start to the FMS 102 in order to provide service to the user in the third femto cell 130.

Then, the FMS 102 receives the Femto Cell Registration Request message from the third femto BS 132, stores registration information of the third femto BS 132, and checks whether a preregistered femto BS exists in the first femto zone 100. If the preregistered femto BS exists (i.e., if the master femto BS exists), the FMS 102 determines the third femto BS 132 as a candidate femto BS of the first femto zone 100 (Step 4306). Herein, the FMS 102, as mentioned above, manages and stores the maximum allowable backhaul link capacity of the first femto zone 100, and manages and stores the list information and the subscription information for the femto BSs 112, 122, 132 in the first femto zone 100. Also, in accordance with the determination of the candidate femto BS, the FMS 102 manages and stores candidate BS information that the second femto BS 122 and the third femto BS 132 have been determined as the candidate femto BSs in the first femto zone 100. For reference, the candidate BS information includes the IDs and/or IP addresses of the second femto BS 122 and the third femto BS 132. In this case, as mentioned above, the FMS 102 manages and stores the master BS information.

Thereafter, the FMS 102 transmits the Femto Cell Registration Acknowledgement message including the master BS information and the candidate BS information to the third femto BS 132 (Step S408). Herein, the Femto Cell Registration Acknowledgement message includes the master BS information that the first femto BS 112 has been determined as the master femto BS in the first femto zone 100 and the candidate BS information that the second femto BS 122 and the third femto BS 132 have been determined as the candidate femto BSs in the first femto zone 100.

Then, the third femto BS 132 receives the Femto Cell Registration Acknowledgement message from the FMS 102, checks information included in the Femto Cell Registration Acknowledgement message, and determines itself as the candidate femto BS of the first femto zone 100 according to the candidate BS information included in the Femto Cell Registration Acknowledgement message (Step S410). Consequently, the third femto BS 132 acts as the candidate femto BS in the first femto zone 100.

Thereafter, the third femto BS 132 checks that the first femto BS 112 is the master femto BS in the first femto zone 100, through the master BS information included in the Femto Cell Registration Acknowledgement message, and transmits the Femto Zone Registration Request message including the candidate BS information to the first femto BS 112 (Step S412). Herein, the third femto BS 122 checks the ID and/or IP address of the first femto BS 112 from the master BS information included in the Femto Cell Registration Acknowledgement message, and transmits the Femto Zone Registration Request message to the first femto BS 112. For reference, preferably, the Femto Zone Registration Request message includes the candidate BS information except the subscription information of the third femto BS 132. However, if the Femto Cell Registration Acknowledgement message that the first femto BS 112 receives from the FMS 102 includes the maximum allowable backhaul link capacity of the first femto zone 100 and the subscription information of the first femto BS 112, the Femto Zone Registration Request message that the first femto BS 112 receives from the third femto BS 132 further includes the subscription information of the third femto BS 132 as well as the candidate BS information.

Then, the first femto BS 112 receives the Femto Zone Registration Request message from the third femto BS 132, and checks the candidate BS information included in the Femto Zone Registration Request message. The first femto BS 112, as mentioned in FIG. 2, determines the backhaul link capacities of the femto BSs (e.g., the backhaul link capacities of the first femto BS 112, the second femto BS 122, and the third femto BS 132) registered in the first femto zone 100 within the maximum allowable backhaul link capacity of the first femto zone 100, in consideration of the maximum allowable backhaul link capacity of the first femto zone 100 and the list information and the subscription information of the femto BSs 112, 122, 132 included in the Femto Cell Registration Acknowledgement message (Step S414).

The backhaul link capacities of the first femto BS 112, the second femto BS 122, and the third femto BS 132 may be determined within range that does not exceed the maximum allowable backhaul link capacity of the first femto zone 100 and does not exceed the maximum allowable backhaul link capacities of the first femto BS 112, the second femto BS 122, and the third femto BS 132 that have been determined by the subscription information of the first femto BS 112, the second femto BS 122, and the third femto BS 132. Herein, the first femto BS 112 statically determines the backhaul link capacities of the first femto Bs 112, the second femto BS 122, and the third femto BS 132 as the same size or dynamically determines the backhaul link capacities of the first femto Bs 112, the second femto BS 122, and the third femto BS 132 according to the capacity priority orders of the first femto BS 112, the second femto BS 122, and the third femto BS 132, within range that does not exceed the maximum allowable backhaul link capacity of the first femto zone 100 and does not exceed each maximum allowable backhaul link capacity of each femto BS. For reference, detailed descriptions for the capacity priority orders and the determination of the backhaul link capacities of the femto BSs according to the capacity priority orders have been omitted since they have been already accomplished.

Thereafter, the first femto BS 112 transmits the Femto Zone Registration Acknowledgement message including the backhaul link capacity of the third femto BS 132 to the third femto BS 132 (Step S416), and transmits to the second femto BS 122 the Femto Zone Capability Change message including the backhaul link capacity of the second femto BS 122 which has been redetermined owing to the registration of the third femto BS 132 (Step S418). Then, the first femto BS 112 provides service to the user in the first femto cell 110 within the redetermined backhaul link capacity of the first femto BS 112 (Step S420).

Also, the second femto BS 122 receives the Femto Zone Capability Change message from the first femto BS 112, checks the backhaul link capacity of the second femto BS 122 included in the Femto Zone Capability Change message, and provides service to the user in the second femto cell 120 within the backhaul link capacity of the second femto BS 122 (Step S422). Meanwhile, the third femto BS 132 receives the Femto Zone Registration Acknowledgement message from the first femto BS 112, and checks the backhaul link capacity of the third femto BS 132 included in the Femto Zone Registration Acknowledgement message. Then, the third femto BS 132 provides service to the user in the third femto cell 130 within the backhaul link capacity of the third femto BS 132 (Step S424), and the first femto BS 112 and the third femto BS 132 perform the Keep Alive process that periodically checks connection (Step S426).

Hereinafter, with reference to FIG. 5, a case that the master femto BS normally stops service in a femto zone in a wireless communication network according to an embodiment of the present invention will now be described.

Figure 5:
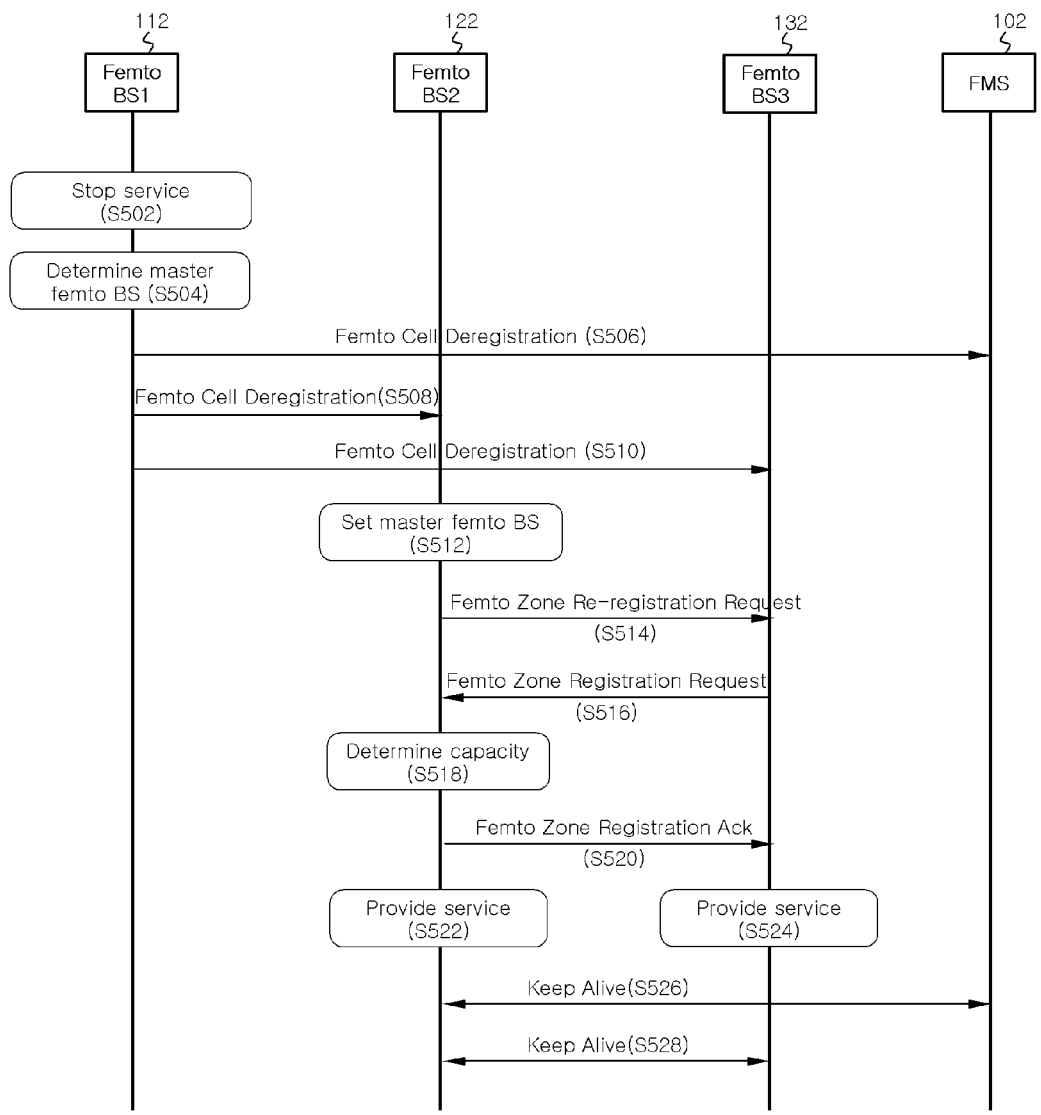
FIG. 5 is a diagram illustrating a process that normally releases the registration of the master femto BS in a wireless communication network according to an embodiment of the present invention.

FIG. 5 is a diagram illustrating a process that that normally releases the registration of the master femto BS in a wireless communication network according to an embodiment of the present invention. For reference, FIG. 5 illustrates a case that the master femto BS normally stops service in the first femto zone 100.

Referring to FIG. 5, after the femto BSs 112, 122, 132 have been registered in the first femto zone 100, if the first femto BS 112 wants to stop service to the first femto cell 110 (Step S502), the first femto Bs 112 determines a new master femto BS that will perform the master femto BS function, among the candidate femto BSs in the first femto zone 100 (Step S504). In this case, the first femto BS 112 may determine the new master femto BS among the candidate femto BSs at random or determine the new master femto Bs by considering the list information and the subscription information of the femto BSs 112, 122, 132 in the first femto zone 100 from the Femto Cell Registration Acknowledgement message and the candidate BS information from the Femto Zone Registration Request message.

Herein, the first femto BS 112 checks the list information and the subscription information of the femto BSs and the candidate BS information, and determines the new master femto BS according to the capacity priority orders that have been determined by the list information and the subscription information of the femto BSs and the candidate BS information or according to the registration orders of the candidate femto BSs that have been checked from the candidate BS information. For reference, hereinafter a case that the new master femto BS is determined according to the registration orders of the candidate femto BSs will now be described. Thus, the first femto BS 112 determines the second femto BS 122 as the new master femto BS, between the second femto BS 122 and the third femto BS 132, and determines the third femto BS 132 as the candidate femto BS.

Thereafter, the first femto BS 112 transmits a Femto Cell Deregistration message for service stop to the FMS 102 (Step S506). Herein, the Femto Cell Deregistration message that is transmitted to the FMS 102 includes the master BS information that the second femto BS 122 has been determined as the master femto BS in the first femto zone 100, in order to inform that the master femto BS in the first femto zone 100 has been changed from the first femto BS 112 to the second femto BS 122.

Then, the first femto BS 112 transmits the Femto Cell Deregistration message to the second femto BS 122 and the third femto BS 132 respectively, in order to inform that the master femto BS in the first femto zone 100 has been changed from the first femto BS 112 to the second femto BS 122 (Step S508, Step S510). Herein, the Femto Cell Deregistration message that is transmitted to the second femto BS 122 includes the master BS information that the second femto BS 122 has been determined as the master femto BS in the first femto zone 100 and the candidate BS information that the third femto BS 132 has been determined as the candidate femto BS in the first femto zone 100. Also, the Femto Cell Deregistration message that is transmitted to the second femto BS 122 includes the maximum allowable backhaul link capacity of the first femto zone 100 and the list information and the subscription information of the femto BSs 112, 122, 132, so that the second femto BS 122 can perform the master femto BS function instead of the first femto BS 112. That is, the first femto BS 112 transmits all information received from the FMS 102 to the second femto BS 122 that has been determined the new master femto BS.

In addition, the Femto Cell Deregistration message that is transmitted to the third femto BS 132 includes the master BS information that the second femto BS 122 has been determined as the master femto BS in the first femto zone 100 and the candidate BS information that the third femto BS 132 has been determined as the candidate femto BS in the first femto zone 100. The master BS information includes the ID and/or IP address of the second femto BS 122 and the candidate BS information includes the ID and/or IP address of the third femto BS 132.

Then, the second femto BS 122 receives the Femto Cell Deregistration message from the first femto BS 112, checks information included in the Femto Cell Deregistration message, and determines itself as the master femto BS of the first femto zone 100 according to the master BS information included in the Femto Cell Deregistration message (Step S512). Consequently, the second femto BS 122 acts as the master femto BS in the first femto zone 100 and performs functions that the first femto BS 112 had performed before stopping service. That is, the second femto BS 122 manages and controls the femto BSs 112, 122, 132 in the first femto zone 100. For reference, if the first femto BS 112 newly requests service start after service stop, the first femto BS 112 performs the process that has been previous mentioned in FIG. 4 and becomes the candidate femto BS. Meanwhile, the third femto BS 132 that has received the Femto Cell Deregistration message from the first femto BS 112 checks that the master femto BS has been changed from the first femto BS 112 to the second femto BS 122 through the master BS information.

Then, the second femto BS 122 transmits a Femto Zone Re-registration Request message to the third femto BS 132 so that the femto BSs registered in the first femto zone 100 may perform femto zone re-registrations (Step S514). In this case, the second femto BS 122 checks all femto BSs (i.e., all candidate femto BSs) registered in the first femto zone through the candidate BS information, and transmits the Femto Zone Re-registration Request message to all candidate femto BSS respectively. Then, the third femto BS 132 receives the Femto Zone Re-registration Request message from the second femto BS 122, and transmits the Femto Zone Registration Request message to the second femto BS 122 in response to the Femto Zone Re-registration Request message (Step S516).

Then, the second femto BS 122 receives the Femto Zone Registration Request message from the third femto BS 132, and determines the backhaul link capacities of the femto BSs (e.g., the backhaul link capacities of the second femto BS 122 and the third femto BS 132) registered in the first femto zone 100 within the maximum allowable backhaul link capacity of the first femto zone 100, in consideration of the maximum allowable backhaul link capacity of the first femto zone 100 and the list information and the subscription information of the femto BSs 112, 122, 132 included in the Femto Cell Deregistration message (Step S518).

The backhaul link capacities of the second femto BS 122 and the third femto BS 132 may be determined within range that does not exceed the maximum allowable backhaul link capacity of the first femto zone 100 and does not exceed the maximum allowable backhaul link capacities of the second femto BS 122 and the third femto BS 132 that have been determined by the subscription information of the second femto BS 122 and the third femto BS 132. Herein, the second femto BS 122 statically determines the backhaul link capacities of the second femto BS 122 and the third femto BS 132 as the same size or dynamically determines the backhaul link capacities of the second femto BS 122 and the third femto BS 132 according to the capacity priority orders of the second femto BS 122 and the third femto BS 132, within range that does not exceed the maximum allowable backhaul link capacity of the first femto zone 100 and does not exceed each maximum allowable backhaul link capacity of each femto BS. For reference, detailed descriptions for the capacity priority orders and the determination of the backhaul link capacities of the femto BSs according to the capacity priority orders have been omitted since they have been already accomplished.

Thereafter, the second femto BS 122 transmits the Femto Zone Registration Acknowledgement message including the backhaul link capacity of the third femto BS 132 to the third femto BS 132 (Step S520). Then, the second femto BS 122 provides service to the user in the second femto cell 120 within the determined backhaul link capacity of the second femto BS 122 (Step S522), and the FMS 102 and the second femto BS 122 perform the Keep Alive process that periodically checks connection (Step S526).

Meanwhile, the third femto BS 132 receives the Femto Zone Registration Acknowledgement message from the second femto BS 122, and checks the backhaul link capacity of the third femto BS 132 included in the Femto Zone Registration Acknowledgement message. Then, the third femto BS 132 provides service to the user in the third femto cell 130 within the determined backhaul link capacity of the third femto BS 132 (Step S524), and the second femto BS 122 and the third femto BS 132 perform the Keep Alive process that periodically checks connection (Step S528).

Hereinafter, with reference to FIG. 6, a case that the master femto BS abnormally stops service in a femto zone in a wireless communication network according to an embodiment of the present invention will now be described.

Figure 6:
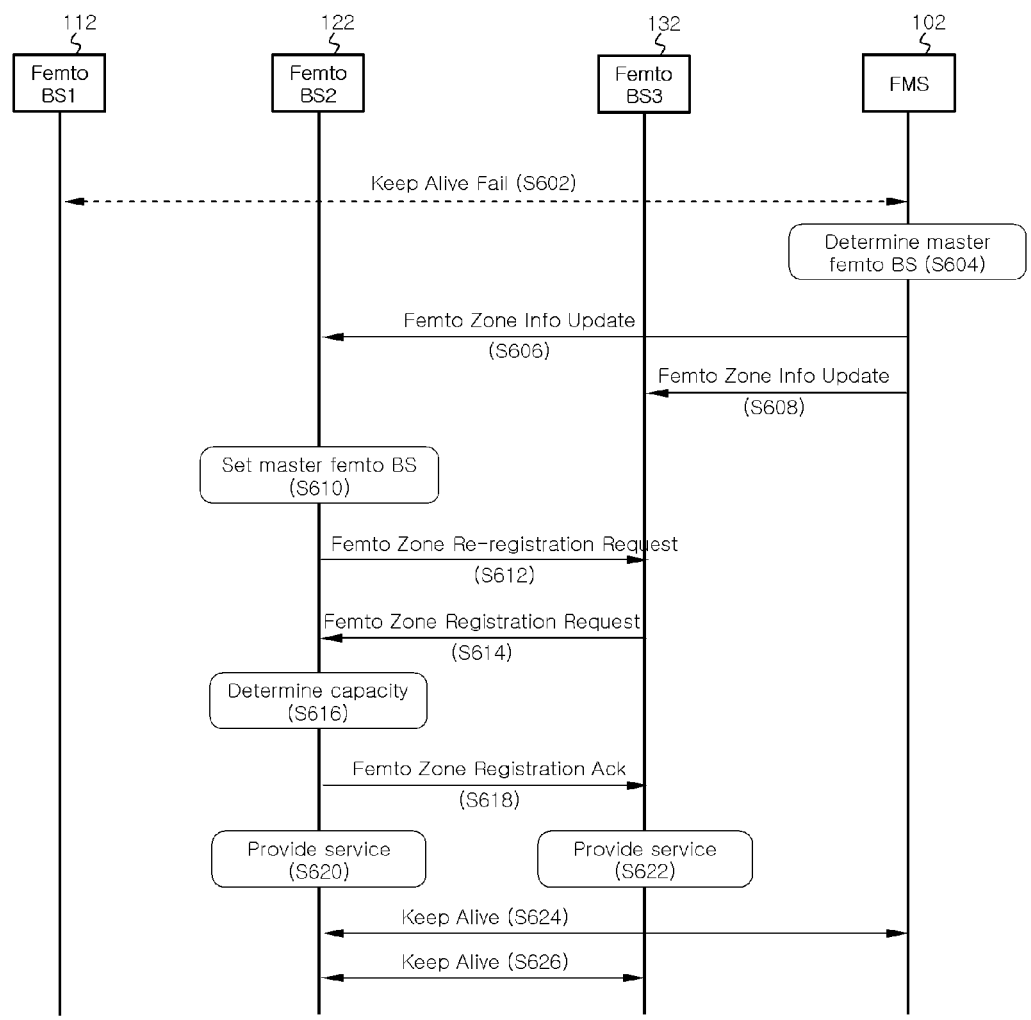
FIG. 6 is a diagram illustrating a process that abnormally releases the registration of the master femto BS in a wireless communication network according to an embodiment of the present invention.

FIG. 6 is a diagram illustrating a process that that abnormally releases the registration of the master femto BS in a wireless communication network according to an embodiment of the present invention. For reference, FIG. 6 illustrates a case that the master femto BS abnormally stops service in the first femto zone 100.

Referring to FIG. 6, after the femto BSs 112, 122, 132 have been registered in the first femto zone 100, if the FMS 102 detects a Keep Alive Failure with the first femto BS 112 (Step S602), the FMS 102 determines a new master femto BS among the candidate femto BSs in the first femto zone 100 that are checked through the Femto Cell Registration Request message (Step S604). For reference, the Keep Alive Failure with the first femto BS 112 may occur, for example, in case that the operation of the first femto BS is abnormally stopped owing to the power off by the user. In this case, the FMS 102 may determine the new master femto BS among the candidate femto BSs at random or determine the new master femto Bs by considering the list information and the subscription information of the femto BSs 122, 132 in the first femto zone 100 from the Femto Cell Registration Request message.

Herein, the FMS 102 checks the registration orders of the candidate femto BSs in the first femto zone 100 from the Femto Cell Registration Request message, checks the list information and the subscription information of the candidate femto BSs and the capacity priority orders that have been determined according to the registration orders of the candidate femto BSs, and determines the new master femto BS according to the registration orders or the capacity priority orders. In this case, if the FMS 102 determines the new master femto BS according to the registration orders of the candidate femto BSs, the FMS 122 determines the second femto BS 122 as the new master femto BS, between the second femto BS 122 and the third femto BS 132, and determines the third femto BS 132 as the candidate femto BS.

Then, the FMS 102 transmits a Femto Zone Information Update message to the second femto BS 122 and the third femto BS 132 respectively, in order to inform that the master femto BS in the first femto zone 100 has been changed from the first femto BS 112 to the second femto BS 122 (Step S606, Step S608). Herein, the Femto Zone Information Update message that is transmitted to the second femto BS 122 includes the master BS information that the second femto BS 122 has been determined as the master femto BS in the first femto zone 100 and the candidate BS information that the third femto BS 132 has been determined as the candidate femto BS in the first femto zone 100. Also, the Femto Zone Information Update message that is transmitted to the third femto BS 132 includes the master BS information that the second femto BS 122 has been determined as the master femto BS in the first femto zone 100 and the candidate BS information that the third femto BS 132 has been determined as the candidate femto BS in the first femto zone 100. The master BS information includes the ID and/or IP address of the second femto BS 122 and the candidate BS information includes the ID and/or IP address of the third femto BS 132. In addition, the Femto Zone Information Update message that is transmitted to the second femto BS 122 includes the maximum allowable backhaul link capacity of the first femto zone 100 and the list information and the subscription information of the femto BSs 112, 122, 132, so that the second femto BS 122 can perform the master femto BS function instead of the first femto BS 112.

Then, the second femto BS 122 receives the Femto Zone Information Update message from the FMS 102, checks information included in the Femto Zone Information Update message, and determines itself as the master femto BS of the first femto zone 100 according to the master BS information included in the Femto Zone Information Update message (Step S610). Consequently, the second femto BS 122 acts as the master femto BS in the first femto zone 100 and performs functions that the first femto BS 112 had performed before stopping service. That is, the second femto BS 122 manages and controls the femto BSs 112, 122, 132 in the first femto zone 100. For reference, if the first femto BS 112 newly requests service start after service stop, the first femto BS 112 performs the process that has been previous mentioned in FIG. 4 and becomes the candidate femto BS. Meanwhile, the third femto BS 132 that has received the Femto Zone Information Update message from the FMS 102 checks that the master femto BS has been changed from the first femto BS 112 to the second femto BS 122 through the master BS information.

Then, the second femto BS 122 transmits a Femto Zone Re-registration Request message to the third femto BS 132 so that the femto BSs registered in the first femto zone 100 may perform femto zone re-registrations (Step S612). In this case, the second femto BS 122 checks all femto BSs (i.e., all candidate femto BSs) registered in the first femto zone through the candidate BS information, and transmits the Femto Zone Re-registration Request message to all candidate femto BSS respectively. Then, the third femto BS 132 receives the Femto Zone Re-registration Request message from the second femto BS 122, and transmits the Femto Zone Registration Request message to the second femto BS 122 in response to the Femto Zone Re-registration Request message (Step S614).

Then, the second femto BS 122 receives the Femto Zone Registration Request message from the third femto BS 132, and determines the backhaul link capacities of the femto BSs (e.g., the backhaul link capacities of the second femto BS 122 and the third femto BS 132) registered in the first femto zone 100 within the maximum allowable backhaul link capacity of the first femto zone 100, in consideration of the maximum allowable backhaul link capacity of the first femto zone 100 and the list information and the subscription information of the femto BSs 112, 122, 132 included in the Femto Zone Information Update message (Step S616). Herein, if the second femto BS 122 does not receive the Femto Zone Registration Request message from the third femto BS 132 in response to the Femto Zone Re-registration Request message, the second femto BS 122 again requests to the FMS 102 the candidate BS information of the first femto zone 100 or determines the backhaul link capacity of the second femto BS 122.

The backhaul link capacities of the second femto BS 122 and the third femto BS 132 may be determined within range that does not exceed the maximum allowable backhaul link capacity of the first femto zone 100 and does not exceed the maximum allowable backhaul link capacities of the second femto BS 122 and the third femto BS 132. Herein, the second femto BS 122 statically determines the backhaul link capacities of the second femto BS 122 and the third femto BS 132 as the same size or dynamically determines the backhaul link capacities of the second femto BS 122 and the third femto BS 132 according to the capacity priority orders of the second femto BS 122 and the third femto BS 132, within range that does not exceed the maximum allowable backhaul link capacity of the first femto zone 100 and does not exceed each maximum allowable backhaul link capacity of each femto BS. For reference, detailed descriptions for the capacity priority orders and the determination of the backhaul link capacities of the femto BSs according to the capacity priority orders have been omitted since they have been already accomplished.

Thereafter, the second femto BS 122 transmits the Femto Zone Registration Acknowledgement message including the backhaul link capacity of the third femto BS 132 to the third femto BS 132 (Step S618). Then, the second femto BS 122 provides service to the user in the second femto cell 120 within the determined backhaul link capacity of the second femto BS 122 (Step S620), and the FMS 102 and the second femto BS 122 perform the Keep Alive process that periodically checks connection (Step S624).

Meanwhile, the third femto BS 132 receives the Femto Zone Registration Acknowledgement message from the second femto BS 122, and checks the backhaul link capacity of the third femto BS 132 included in the Femto Zone Registration Acknowledgement message. Then, the third femto BS 132 provides service to the user in the third femto cell 130 within the determined backhaul link capacity of the third femto BS 132 (Step S622), and the second femto BS 122 and the third femto BS 132 perform the Keep Alive process that periodically checks connection (Step S626).

Hereinafter, with reference to FIG. 7, a case that the candidate femto BS abnormally stops service in a femto zone in a wireless communication network according to an embodiment of the present invention will now be described.

Figure 7:
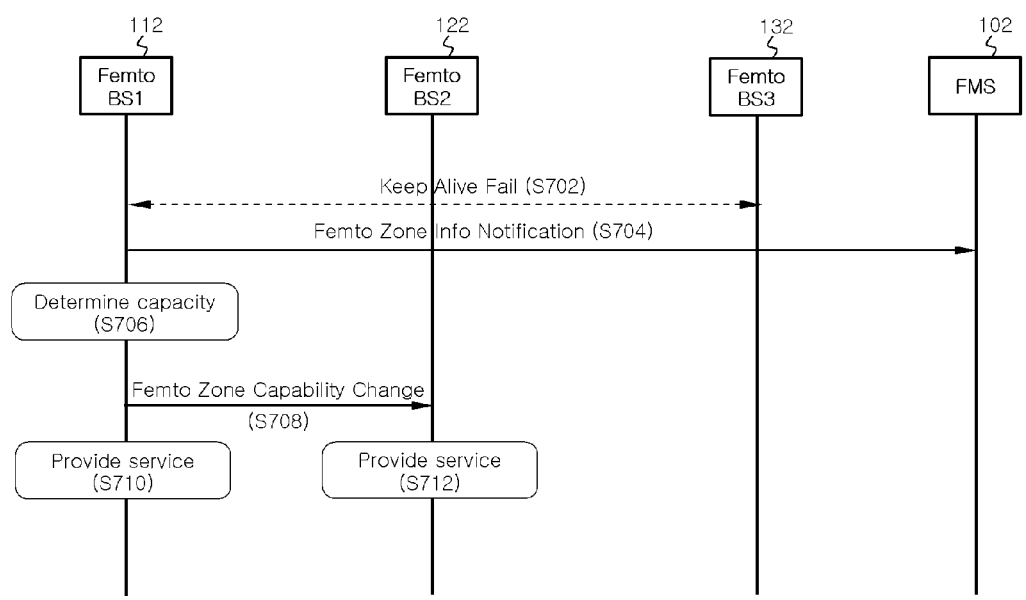
FIG. 7 is a diagram illustrating a process that normally releases the registration of the candidate femto BS in a wireless communication network according to an embodiment of the present invention.

FIG. 7 is a diagram illustrating a process that that abnormally releases the registration of the candidate femto BS in a wireless communication network according to an embodiment of the present invention. For reference, FIG. 7 illustrates a case that the candidate femto BS 132 among the femto BSs 112, 122, 132 abnormally stops service in the first femto zone 100.

Referring to FIG. 7, after the femto BSs 112, 122, 132 have been registered in the first femto zone 100, if the first femto BS 112 detects a Keep Alive Failure with the third femto BS 132 (Step S702), the first femto BS 112 transmits a Femto Zone Information Notification message to the FMS 102 in order to inform the service stop of the third femto BS 132 (Step S704).

For reference, the Keep Alive Failure with the third femto BS 132 may occur, for example, in case that the operation of the third femto BS is abnormally stopped owing to the power off by the user. Meanwhile, if the third femto BS 132 normally stops service to the third femto cell 130, the third femto BS 132 transmits the Femto Cell Deregistration message to the first femto BS 112 and the first femto BS 112 transmits the Femto Zone Information Notification message to the FMS 102.

The Femto Zone Information Notification message includes the candidate BS information that the second femto BS 122 has been determined as the only candidate femto BS in the first femto zone 100. The FMS 102 checks that the first femto BS 112 and the second femto BS 122 are registered in the first femto zone 100, through the candidate BS information included in the Femto Zone Information Notification message.

Then, The first femto BS 112, as mentioned in FIG. 2, determines the backhaul link capacities of the femto BSs (e.g., the backhaul link capacities of the first femto BS 112 and the second femto BS 122) registered in the first femto zone 100 within the maximum allowable backhaul link capacity of the first femto zone 100, in consideration of the maximum allowable backhaul link capacity of the first femto zone 100 and the list information and the subscription information of the femto BSs 112, 122, 132 included in the Femto Cell Registration Acknowledgement message (Step S706). For reference, detailed descriptions for the determination of the backhaul link capacities of the first femto BS 112 and the second femto BS 122 have been omitted since they have been already accomplished.

Thereafter, the first femto BS 112 transmits to the second femto BS 122 the Femto Zone Capability Change message including the backhaul link capacity of the second femto BS 122 which has been redetermined owing to the deregistration of the third femto BS 132 (Step S708). Then, the first femto BS 112 provides service to the user in the first femto cell 110 within the redetermined backhaul link capacity of the first femto BS 112 (Step S710).

Also, the second femto BS 122 receives the Femto Zone Capability Change message from the first femto BS 112, and checks the backhaul link capacity of the second femto BS 122 included in the Femto Zone Capability Change message. Then, the second femto BS 122 provides service to the user in the second femto cell 120 within the backhaul link capacity of the second femto BS 122 (Step S712).

While the invention has been shown and described with reference to a certain preferred embodiment thereof, it will be understood by those skilled in the art that various changes in form and details may be made therein without departing from the spirit and scope of the invention as defined by the appended claims.

The invention claimed is:

1. A method for managing a femto zone in a wireless communication network, the method comprising:
   receiving a registration request message from a first femto base station among femto base stations in the femto zone that share a backhaul link;
   registering the first femto base station and determining the first femto base station as a master base station or a candidate base station in accordance with the registration request message; and
   transmitting a registration acknowledgement message to the first femto base station in response to the registration request message, wherein the registration acknowledgement message includes the maximum allowable backhaul link capacity of the femto zone and master base station information when the first femto base station is determined as the master base station, and includes the master base station information and candidate base station information when the first femto base station is determined as the candidate base station.

2. The method of claim 1, when the registration request message is firstly received in the femto zone, wherein the first femto base station is determined as the master base station.

3. The method of claim 1, when the first femto base station is determined as the master base station, wherein the registration acknowledgement message includes list information and subscription information of the femto base stations.

4. The method of claim 1, wherein the master base station information includes at least one of Identifier (ID) and Internet Protocol (IP) address of the master base station and the candidate base station information includes at least one of ID and IP address of the candidate base station.

5. The method of claim 1, when the first femto base station is determined as the master base station, after the step of transmitting the registration acknowledgement message, further comprising:
   performing a connection check with the first femto base station.

6. The method of claim 5, further comprising:
   deciding whether a second femto base station is determined as a new master femto base station, when the connection check for the first femto base station fails; and
   transmitting a femto zone information update message to the second femto base station,
   wherein the femto zone information update message includes the maximum allowable backhaul link capacity of the femto zone, the master base station information, and the candidate base station information when the second femto base station is determined as the new master base station, and includes the master base station information when the second femto base station is not determined as the new master base station.

7. A method for managing a femto zone in a wireless communication network, the method comprising:
   determining a backhaul link capacity of a first femto base station in consideration of the maximum allowable backhaul link capacity of the femto zone and subscription information of the first femto base station, by the first femto base station that is designated as a master base station; and
   when the first femto base station receives a registration request message from a second femto base station that is designated as a candidate base station, determining the backhaul link capacity of the second femto base station in consideration of the maximum allowable backhaul link capacity of the femto zone and subscription information of the second femto base station, and transmitting the backhaul link capacity of the second femto base station to the second femto base station, by the first femto base station,
   wherein the master base station and the candidate base station are determined by a femto zone management system that manages femto base stations in each femto zone, and the femto base stations in each femto zone share a backhaul link.

8. The method of claim 7, further comprising:
   determining a service stop of the first femto base station and determining a third femto base station among the femto base stations designated to the candidate base station as the new master base station; and
   transmitting the maximum allowable backhaul link capacity of the femto zone and the subscription information of the femto base stations to the third femto base station and transmitting information about the new master base station to the second femto base station.

9. The method of claim 8, further comprising:
   determining the backhaul link capacity of the third femto base station in consideration of the maximum allowable backhaul link capacity of the femto zone and subscription information of the third femto base station, by the third femto base station; and
   determining the backhaul link capacity of the second femto base station in consideration of the maximum allowable backhaul link capacity of the femto zone and subscription information of the second femto base station, and transmitting the backhaul link capacity of the second femto base station to the second femto base station, by the third femto base station.

10. The method of claim 7, after the step of transmitting the backhaul link capacity of the second femto base station, further comprising:
    performing a connection check with the second femto base station, by the first femto base station.

11. A femto base station in a wireless communication network, the femto base station comprising:
    a network interfacing part for communicating with a femto zone management system and at least one femto base station in a femto zone that share a backhaul link;
    a transmission/reception part for communicating with a mobile station;
    a wireless processor for controlling the transmission/reception part;
    a network processor for controlling the network interfacing part;
    a setting part for setting as a master base station or a candidate base station in accordance with a message that the network interfacing part receives;

a storing part for storing list information and subscription information for the femto base stations in the femto zone and base station information indicating that each femto base station is set as the master base station or the candidate base station, when being set as the master base station; and a determining part for determining backhaul link capacities of the femto base stations registered in the femto zone.

12. The femto base station of claim 11, further comprising:
a checking part for performing a connection check with at least one of the femto zone management system and the femto base stations.

13. The femto base station of claim 11, wherein the determining part determines the backhaul link capacity in consideration of the maximum allowable backhaul link capacity of the femto zone and the subscription information of the femto base stations registered in the femto zone.

14. The femto base station of claim 11, wherein the base station information includes at least one of Identifier (ID) and Internet Protocol (IP) address of the corresponding base station.

15. A femto zone management system in a wireless communication network, the femto zone management system comprising:
a network interfacing part for communicating with femto base stations in at least one femto zone that share a backhaul link;
a determining part for determining each femto base station requesting a registration as a master base station or a candidate base station; and
a storing part for storing list information and subscription information for the femto base stations in the femto zone and storing base station information indicating that each femto base station is set as the master base station or the candidate base station,
wherein the network interfacing part transmits a registration acknowledgement message to the femto base station requesting the registration, and
wherein the registration acknowledgement message includes the maximum allowable backhaul link capacity of the femto zone, base station information, list information and subscription information of the femto base stations when the femto base station requesting the registration is determined as the master base station, and includes the base station information when the femto base station requesting the registration is determined as the candidate base station.

16. The femto zone management system of claim 15, wherein the determining part determines the femto base station firstly requesting the registration in the femto zone as the master base station.

17. The femto zone management system of claim 15, wherein the base station information includes at least one of Identifier (ID) and Internet Protocol (IP) address of the corresponding base station.

18. The femto zone management system of claim 15, further comprising:
a checking part for performing a connection check with the femto base station that is determined as the master base station.

* * * * *